(12) United States Patent
Smith (10) Patent No.: US 9,038,915 B2
(45) Date of Patent: May 26, 2015

(54) PRE-PAID USAGE SYSTEM FOR ENCODED INFORMATION READING TERMINALS

(75) Inventor: Taylor Smith, Charlotte, NC (US)

(73) Assignee: Metrologic Instruments, Inc., Blackwood, NJ (US)

( * ) Notice: Subject to any disclaimer, the term of this patent is extended or adjusted under 35 U.S.C. 154(b) by 540 days.

(21) Appl. No.: 13/018,147

(22) Filed: Jan. 31, 2011

(65) Prior Publication Data

US 2012/0193411 A1  Aug. 2, 2012

(51) Int. Cl.
G06K 19/00 (2006.01)
G06Q 20/34 (2012.01)
G06Q 20/28 (2012.01)
G06Q 20/38 (2012.01)

(52) U.S. Cl.
CPC ............ *G06Q 20/3567* (2013.01); *G06Q 20/28* (2013.01); *G06Q 20/38215* (2013.01)

(58) Field of Classification Search
USPC .................. 235/462, 487, 492; 340/10, 572
See application file for complete search history.

(56) References Cited

U.S. PATENT DOCUMENTS

| | | | |
|---|---|---|---|
| 6,976,253 | B1 | 12/2005 | Wierman et al. |
| 7,062,446 | B1 | 6/2006 | Suhy, Jr. et al. |
| 7,085,775 | B2 | 8/2006 | Short, III et al. |
| 7,395,275 | B1 | 7/2008 | Parent et al. |
| 7,583,960 | B2 | 9/2009 | Wierman et al. |
| 2002/0188702 | A1 | 12/2002 | Short et al. |
| 2004/0252197 | A1 | 12/2004 | Fraley et al. |
| 2005/0060233 | A1* | 3/2005 | Bonalle et al. .................. 705/16 |
| 2008/0183800 | A1 | 7/2008 | Herzog et al. |
| 2009/0001173 | A1 | 1/2009 | Sevier et al. |
| 2009/0040021 | A1* | 2/2009 | Seo et al. ...................... 340/10.1 |
| 2009/0049518 | A1 | 2/2009 | Roman et al. |
| 2009/0128294 | A1* | 5/2009 | Kim et al. ..................... 340/10.1 |
| 2009/0182802 | A1 | 7/2009 | Tran et al. |
| 2009/0210140 | A1 | 8/2009 | Short, III et al. |
| 2009/0318124 | A1 | 12/2009 | Haughn |
| 2009/0318125 | A1 | 12/2009 | Normark et al. |
| 2010/0037088 | A1 | 2/2010 | Krivopaltsev et al. |
| 2010/0045796 | A1 | 2/2010 | Fraley et al. |
| 2010/0048193 | A1 | 2/2010 | Ortion et al. |
| 2010/0274614 | A1 | 10/2010 | Fraley et al. |

OTHER PUBLICATIONS

Jul. 23, 2012 European Search Report in European Application No. 12153186.7.
Aug. 7, 2012 Communication pursuant to Article 94(3) EPC in European Application No. 12153186.7.

* cited by examiner

*Primary Examiner* — Matthews Mikels
(74) *Attorney, Agent, or Firm* — Additon, Higgins & Pendleton, P.A.

(57) ABSTRACT

A fleet management system for managing a fleet of encoded information reading (EIR) terminals can comprise one or more computers, a fleet management software module, and a payment processing software module in communication with the fleet management software module. The fleet management software module can be configured, responsive to receiving a customer initiated request, to generate an unlocking message upon processing a payment by the payment processing software module. The unlocking message can be provided by a bar code to be read by an EIR terminal, or by a bit stream to be transferred to an EIR terminal via network. Each EIR terminal can be configured to perform not more than a pre-defined number of EIR operations responsive to receiving the unlocking message.

20 Claims, 8 Drawing Sheets

| TERMINAL ID 312 | # OF REQUESTED EIR OPS 314 |

FIG. 3

CUSTOMER FLEET TABLE 410

| CUSTOM ID 412 | TERM ID 414 |
|---|---|
|  |  |
|  |  |

TERMINAL PARAMETERS TABLE 450

| TERM ID 452 | TERM TYPE 454 | # OF EIR OPS |
|---|---|---|
|  |  |  |
|  |  |  |
|  |  |  |
|  |  |  |

PRICING TABLE 480

| TERM TYPE 482 | SIZE OF FLEET 484 | # OF EIR OPS 486 | EIR OP PRICE 488 |
|---|---|---|---|
|  |  |  |  |
|  |  |  |  |
|  |  |  |  |

EVENT LOG TABLE 490

| TIMESTAMP 492 | TERMINAL ID 494 | # OF EIR OPS 496 | AMOUNT OF PAYMENT 498 | PAYMENT TX ID 499 |
|---|---|---|---|---|
|  |  |  |  |  |
|  |  |  |  |  |

PRE-PAID USAGE SYSTEM FOR ENCODED INFORMATION READING TERMINALS

FIELD OF THE INVENTION

The present invention relates generally to data collection by mobile computing devices such as encoded information reading terminals, and in particular to a pre-paid usage model for encoded information reading terminals.

BACKGROUND OF THE INVENTION

Various organizations, including retail and manufacturing businesses, can employ sizeable fleets of encoded information reading (EIR) terminals, including bar code reading terminals and other types of EIR terminals. The capital expenditure involved in purchasing the EIR terminals needed for the business operation, can be prohibitively high for some businesses.

SUMMARY OF THE INVENTION

In one embodiment, there is provided an encoded information reading (EIR) terminal. The EIR terminal can comprise a central processing unit (CPU), a memory communicatively coupled to the CPU, a communication interface, and an EIR device provided by a bar code reading device, an RFID reading device, or a card reading device. The EIR device can configured to perform outputting raw message data containing an encoded message or outputting decoded message data corresponding to an encoded message.

The EIR terminal can be configured to initialize a counter of EIR operations responsive to inputting an unlocking encoded message via the communication interface or via the EIR device. The EIR terminal can be further configured, before executing an EIR operation, to ascertain whether the attempted EIR operation is permitted by comparing the counter of EIR operations to a pre-defined constant value. The EIR terminal can be further configured to increment or decrement the counter of EIR operations in course of executing each EIR operation.

In another embodiment, there is provided a fleet management system for managing a plurality of EIR terminals. The fleet management system can comprise one or more computers, a fleet management software module, and a payment processing software module in communication with said fleet management software module.

The fleet management software module can be configured, responsive to receiving a customer initiated request, to generate an unlocking message upon processing a payment by the payment processing software module. The unlocking message can be provided by a bar code to be read by an EIR terminal, or by a bit stream to be transferred to an EIR terminal via the communication interface. Each EIR terminal can be configured to perform not more than a pre-defined number of EIR operations responsive to receiving the unlocking message.

BRIEF DESCRIPTION OF THE DRAWINGS

The objects and features of the invention can be better understood with reference to the claims and drawings described below. The drawings are not necessarily to scale, the emphasis is instead generally being placed upon illustrating the principles of the invention. Within the drawings, like reference numbers are used to indicate like parts throughout the various views.

DETAILED DESCRIPTION OF THE INVENTION

In one embodiment, there is provided an encoded information reading (EIR) terminal which can be programmed to execute a pre-defined number of encoded information reading operations which have been pre-paid for by the terminal user (e.g., a retail business). After executing the pre-defined number of the EIR operations, the EIR terminal can be programmed to notify the terminal operator that a new batch of EIR operations needs to be purchased from the terminal manufacturer/seller/lessor. In one embodiment, the EIR terminal can be programmed to notify the terminal operator upon reaching a pre-defined usage threshold, e.g., after executing 90% of pre-paid EIR operations.

Should the terminal user decide to continue using the EIR terminal after executing the pre-paid EIR operations, a new batch of EIR operations can be purchased from the terminal manufacturer/seller/lessor. In one embodiment, the new batch of EIR operations can be ordered via web interface and paid for by a credit card. A skilled artisan would appreciate the fact that other methods of ordering and payment are within the spirit and the scope of the invention.

A fleet management system run by the terminal manufacturer/seller/lessor can, upon receiving the terminal user's request for a new batch of EIR operations, process the payment and generate an unlocking message to program the EIR terminal to execute a pre-defined number of EIR operations. The unlocking message can be encrypted, e.g., using a shared key or a public/private key pair. The unlocking message can be encoded in a bar code to be read by the EIR terminal, or can be transmitted to the EIR terminal over a network.

The pre-paid usage model according to the invention can be beneficial, e.g., for small retail businesses, for which the capital expenditure incurable by purchasing the fleet of EIR terminals needed for business operation, can be prohibitively high. Furthermore, the pre-paid usage model according to the invention also affords additional advantages, as compared to the traditional lease model, to the EIR terminal manufacturer/seller/lessor, since the pre-paid usage model inherently provides a strong incentive for the terminal user to make timely payments for EIR terminal usage.

Figure 1:
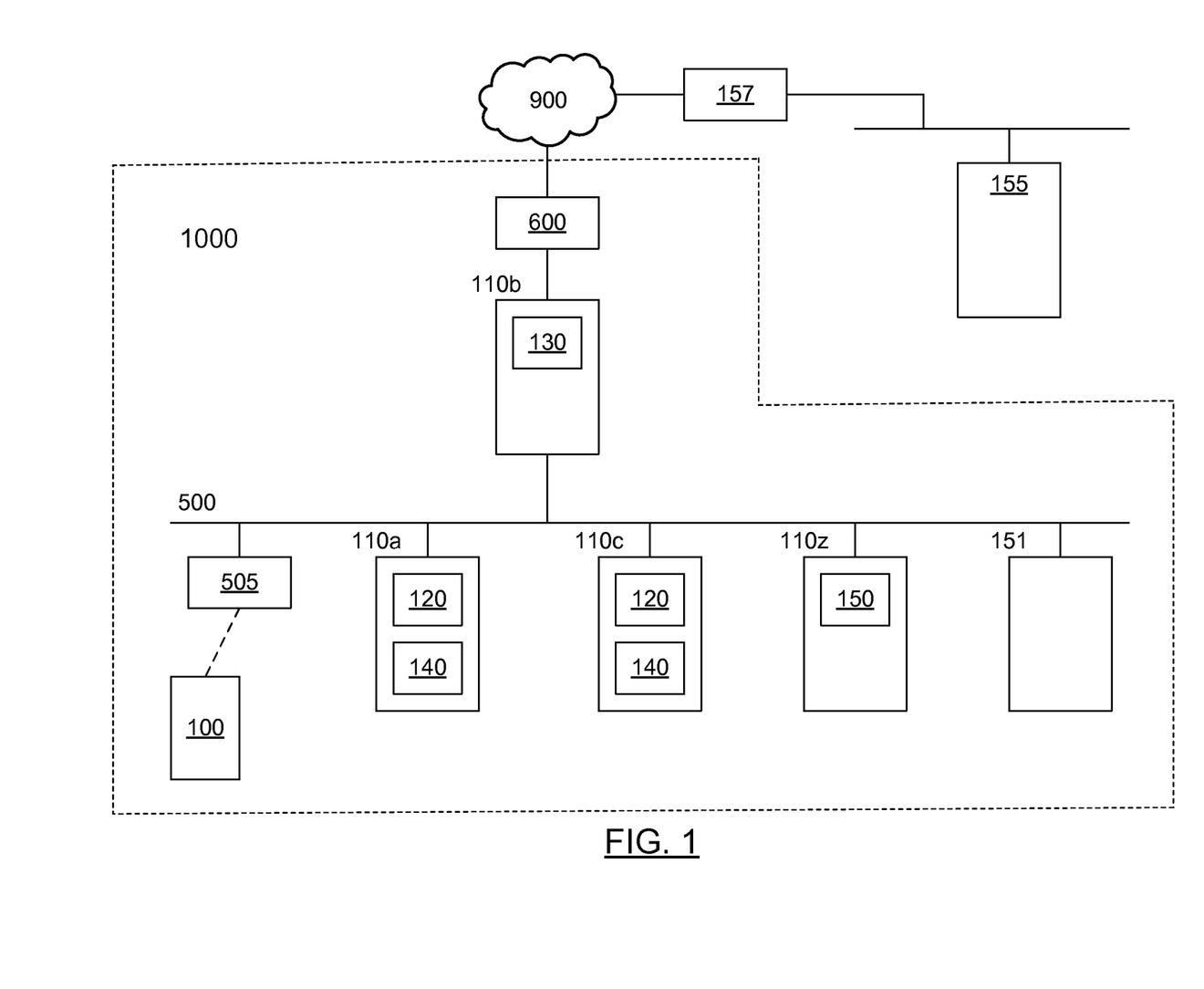
FIG. 1 illustrates a layout of one embodiment of a fleet management system for managing a plurality of EIR terminals according to the invention.

A layout of one embodiment of a fleet management system for managing a plurality of EIR terminals is shown in FIG. 1. The fleet management system 1000 can comprise one or more computers 110a-110z. A "computer" herein shall refer to a programmable device for data processing, including a central processing unit (CPU) 310, a memory 320, and at least one communication interface. A computer can be provided, e.g., by a personal computer (PC) running Windows™ operating system. A skilled artisan would appreciate the fact that other hardware platforms and operating systems are within the spirit and the scope of the invention. The fleet management system 1000 can further comprise a fleet management software module 120 which can be run by one or more computers selected from the group of computers 110a-110z. The fleet management software module can be accessed by end users (e.g., wishing to purchase a new batch of scans) via HTTP server software module 130, which can be executed by one or more computers selected from the group of computers 110a-110z. The computers running HTTP server can be accessible from wide area network WAN (e.g., the Internet) 900.

The fleet management system 1000 can further comprise a payment processing software module 140 which can be run by one or more computers selected from the group of computers 110a-110z. An instance of the fleet management software module 120 can communicate with an instance of the payment processing software module 140 using suitable inter-process communication (IPC) methods (e.g., over a TCP connection through a local area network (LAN) 500 when the instances of the two programs are executed by different computers, or within the local host when the instances of the two programs are collocated on the same computer). In one embodiment, the payment processing software module 140 can communicate within an external payment processing system (not shown in FIG. 1), e.g., over a WAN (e.g., the Internet) 900.

The fleet management system 1000 can further comprise a fleet management database 150. In one embodiment, the fleet management database 150 can reside one or more computers selected from the group of computers 110a-110z. In another embodiment, the fleet management database 150 can reside one or more computers which can be located remotely from the local facility hosting other components of the fleet management system 1000. In one embodiment, the fleet management database can be provided by a relational database (e.g., Orcale™ or DB/2™). A skilled artisan would appreciate the fact that other types of databases are within the spirit and the scope of the invention.

An instance of the fleet management software module 120 can communicate with an instance of the fleet management database using suitable inter-process communication (IPC) methods (e.g., over a TCP connection through a local area network (LAN) 500 when the instances of the two programs are executed by different computers, or within the local host when the instances of the two programs are collocated on the same computer).

In one embodiment, the fleet management software module 120, HTTP server software module 130, payment processing software module 140 and fleet management database 150 can be collocated on a single computer. In another embodiment, the fleet management software module 120, HTTP server software module 130, payment processing software module 140 and fleet management database 150 can reside on different computers. In a yet another embodiment, scalability can be achieved by employing several computers to run multiple instances of the fleet management software module 120, HTTP server software module 130, payment processing software module 140 and fleet management database 150. In a yet another embodiment, some of the software modules 120, 130, 140, and database 150 can be collocated while other can reside on different computers.

In the above description of the fleet management system 1000, the functionality is split among the software modules 120, 130, 140, and the database 150 for illustrative purposes only. A skilled artisan would appreciate the fact that the functionality of the software modules 120, 130, 140, and database 150 described herein supra can be implemented by a single software module, or can be split among two or more software modules without departing from the spirit and the scope of the invention.

A skilled artisan would also appreciate the fact that other software and hardware components which are typically included in a web application infrastructure (e.g., firewalls, HTTP load balancers, SSL accelerators) are within the spirit and the scope of the invention. One embodiment of the method of implementing the pre-paid usage model for a fleet of EIR terminals according to the invention is now being described with references to the flowchart of FIG. 2. The method can be implemented by the fleet management software module 120 described herein supra.

Figure 2:
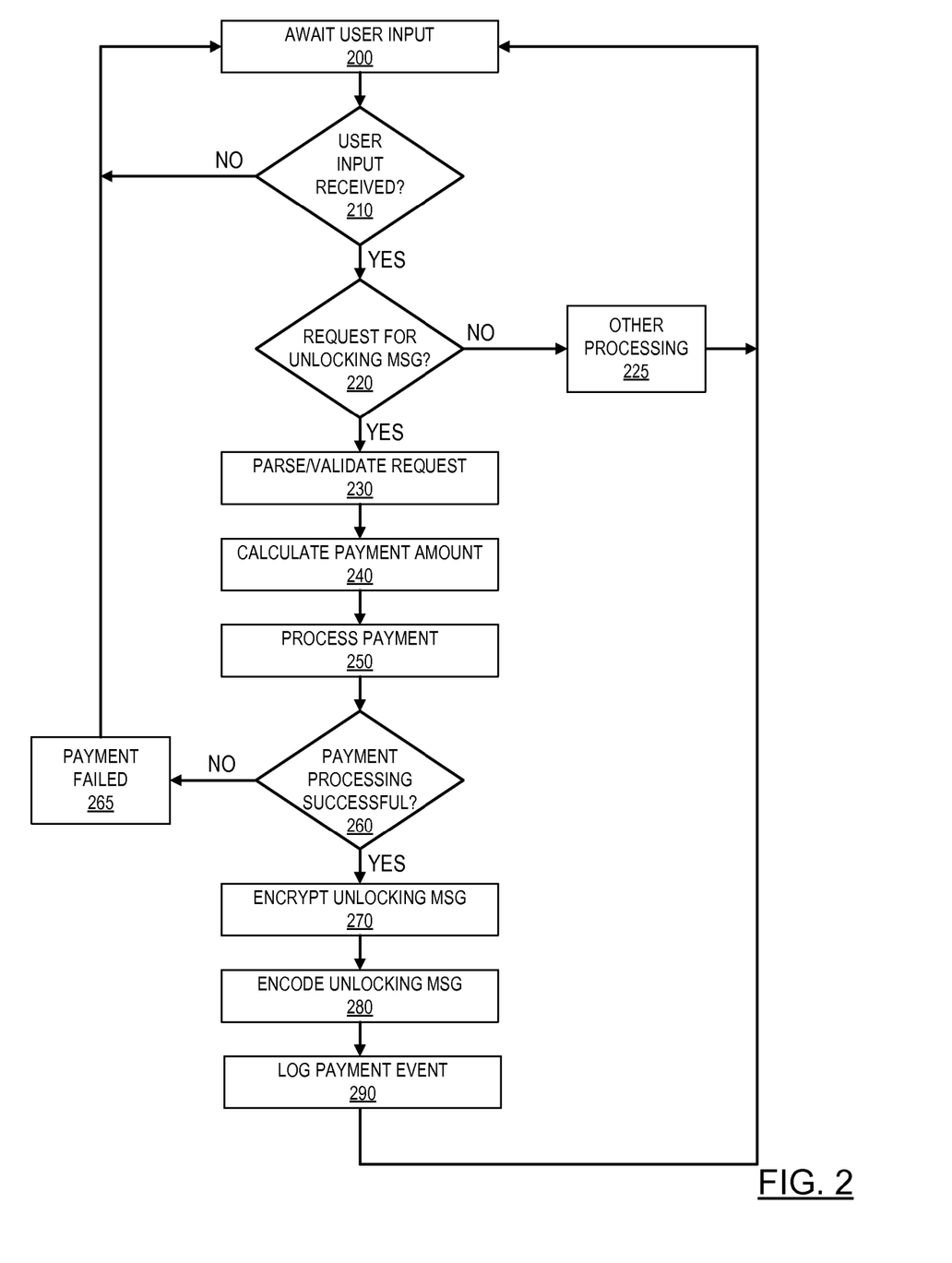
FIG. 2 illustrates a flowchart of one embodiment of the method of implementing the pre-paid usage model for a fleet of EIR terminals according to the invention.

At steps 200 and 210, the method can await a user request for processing. In one embodiment, the user requests can be initiated through a browser-based user interface and transmitted to the fleet management software module 120 via the HTTP server software module 130.

At step 220, the method can ascertain whether a request for unlocking message was received. If so, the method can continue to step 230.

At step 230, the method can parse and validate the request for unlocking message. In one embodiment, the request for unlocking message can comprise the fields schematically shown in FIG. 3.

Referring again to FIG. 2, at step 240, the method can calculate the amount of payment for the requested number of EIR operations. In one embodiment, the method can query the fleet management database 150 to ascertain the EIR operation price for the EIR terminal identified by the customer code, by the terminal type, or by the terminal serial number. In another embodiment, the EIR operation price can further depend upon the usage history, size of the fleet employed by the customer, number of EIR operations requested, and/or other factors.

Figure 4:
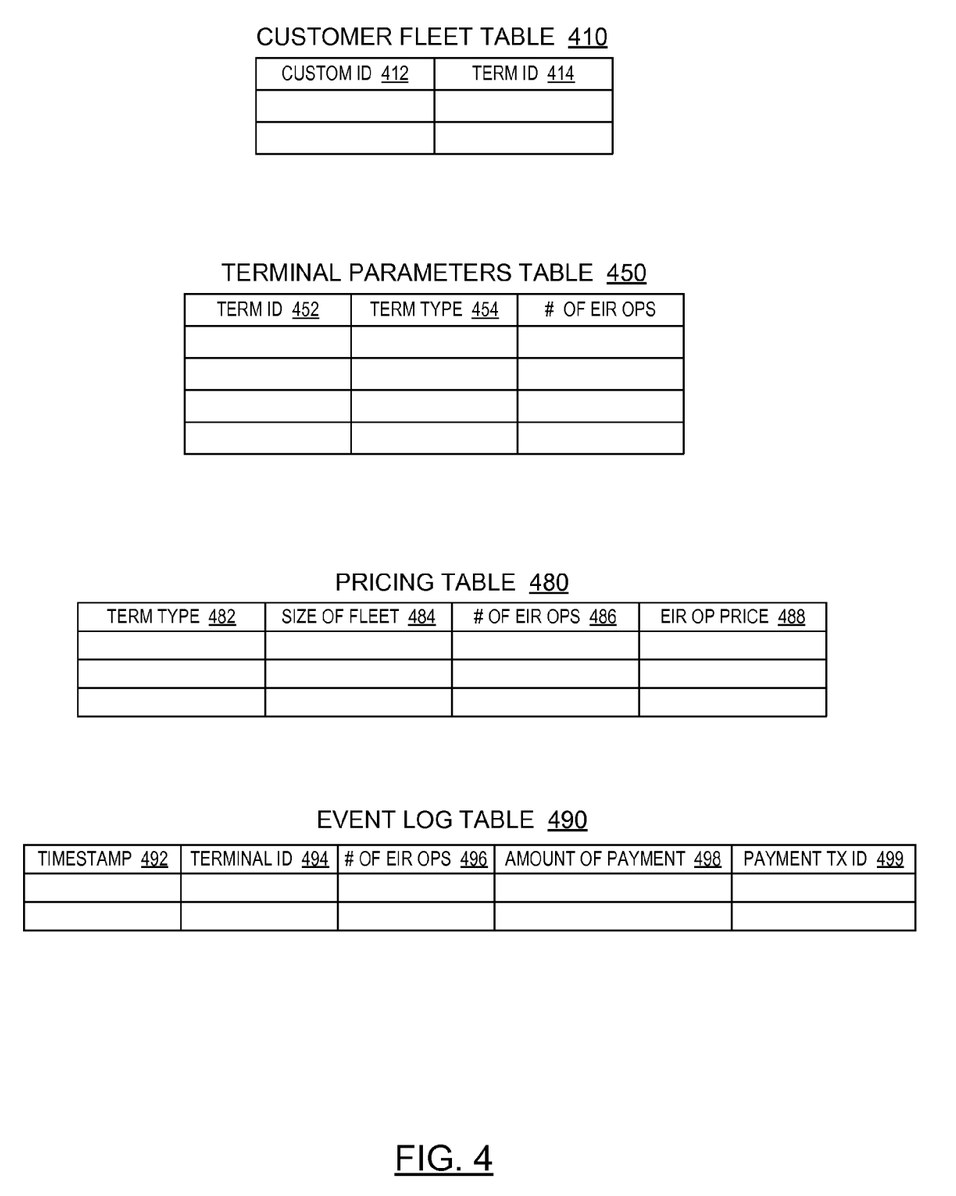
FIG. 4 illustrates one embodiment of the structure of the fleet management database tables according to the invention.

In one embodiment, the fleet management database can include the tables, an exemplary structure of which is shown in FIG. 4.

In another embodiment, the method can use the same EIR operation price for all unlocking code requests and thus skip the step of querying the fleet management database 150.

Referring again to FIG. 2, at step 250, the method can invoke the payment processing software module 140 to process a payment for the requested number of EIR operations using the payment details supplied as part of the request for unlocking message.

In one embodiment, the payment processing software module can process credit card payments by communicating with an external payment processing system (not shown in FIG. 1) over the WAN (e.g., the Internet) 900.

At step 260, the method can ascertain whether the payment was processed successfully. If so, the processing can continue at step 270. Otherwise, the method can branch to step 265 (notifying the user of the failed attempt to process the payment) and then loop back to step 200.

At step 270, the method can encrypt the unlocking message. In one embodiment, the encryption can be performed using a shared key. In another embodiment, the encryption can be performed using a public/private key pair (asymmetric key encryption). A skilled artisan would appreciate the fact that other encryption methods are within the spirit and the scope of the invention.

At step 280, the unlocking message can be encoded in a bar code to be read by the EIR terminal. In another embodiment, the bit stream representing the unlocking message can be transmitted to the EIR terminal over a network. A skilled artisan would appreciate the fact that other methods of delivering the unlocking message to the EIR terminal are within the spirit and the scope of the invention.

At step 290, the method can query the fleet management database 150 to log the payment event. Upon completing step 290, the method can loop back to step 200.

Figure 3:
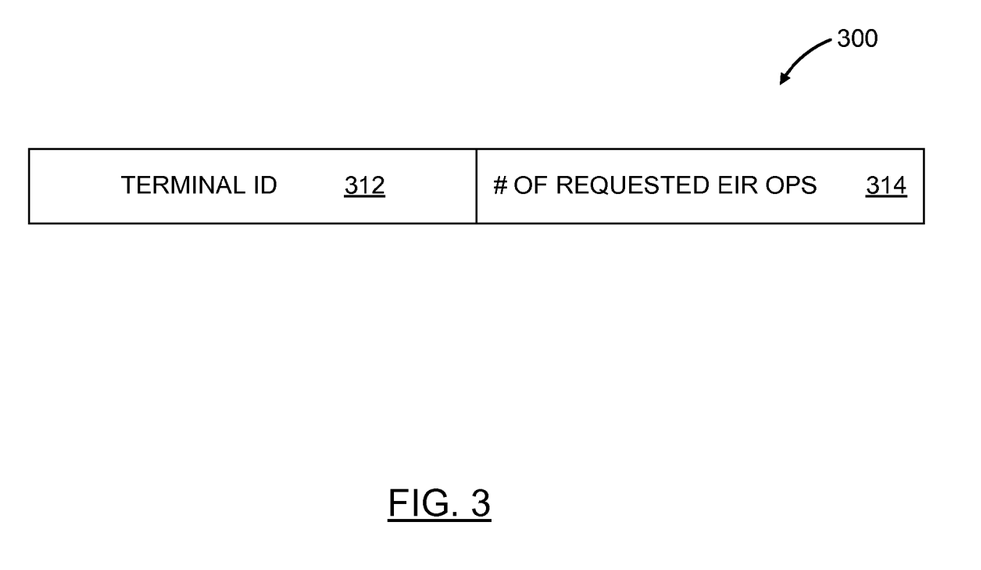
FIG. 3 illustrates one embodiment of the structure of the request for unlocking message according to the invention.

One embodiment of the structure of the request for unlocking message is now being described with references to FIG. 3. The request for unlocking message structure 300 can include the following fields:
  terminal identifier field 312. In one embodiment, the terminal identifier can be provided by a terminal serial number assigned to the EIR terminal by the manufacturer;
  number of requested EIR operations field 314.

In another embodiment, the request for unlocking message structure can further include other fields, e.g., a customer identifier field.

One embodiment of the structure of the fleet management database tables is now being described with references to FIG. 4. The fleet management database can include the following tables: customer fleet table 410, terminal parameters table 450, and payment events log table 480.

In one embodiment, the customer fleet table 410 can include the following fields:
  customer identifier 412;
  terminal identifier 414;

In one embodiment, the terminal parameters table 450 can include the following fields:
  terminal identifier 452;
  terminal type field 454;
  total number of purchased to-date EIR operations 456.

In one embodiment, the pricing table 480 can include the following fields:
  terminal type 482;
  size of customer's fleet 484;
  total number of purchased to-date EIR operations for the terminal 486;
  price of a single EIR operation 488.

In one embodiment, the payment events log table 490 can include the following fields:
  timestamp 492;
  terminal identifier 494;
  number of EIR operations purchased 496;
  amount of payment 498;
  payment transaction identifier 499.

Referring back to FIG. 2, at step 240, the method of implementing the pre-paid usage model for a fleet of EIR terminals can calculate the amount of payment for the requested number of EIR operations. In one embodiment, the method can parse the request for unlocking message to extract the terminal identifier value and then query the fleet management database 150 to ascertain the customer identifier corresponding to the terminal identifier. Next, the method can query the fleet management database 150 to ascertain the number of EIR operations previously purchased for the terminal for which request is being processed. Next, the method can query the fleet management database 150 to ascertain the size of customer's terminal fleet. Finally, the method can query the fleet management database 150 to ascertain the price of a single EIR operation which in one embodiment can depend on the number of operations being purchased (i.e. being subject to a volume discount). The amount of payment can then be calculated by multiplying the EIR operation price by the number of EIR operations requested. A skilled artisan would appreciate the fact that other structures of the fleet management database 150 are within the spirit and the scope of the invention.

Figure 5:
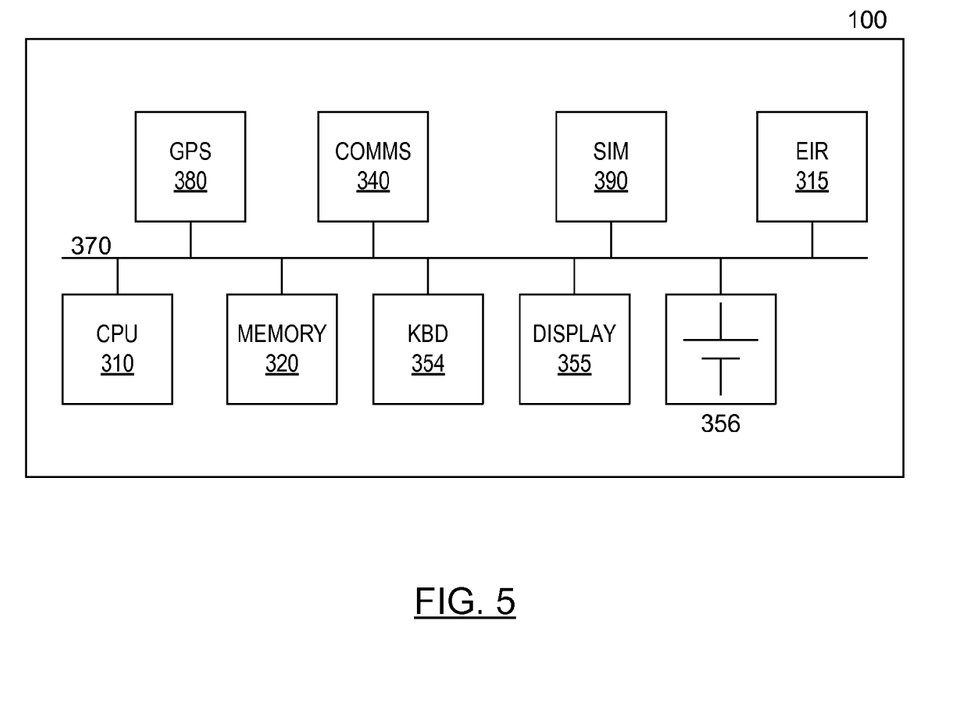
FIG. 5 illustrates a component-level diagram of an EIR terminal according to the invention.

A block diagram of an EIR terminal suitable to practice the present invention is now being described with references to FIG. 5. The EIR terminal 100 can comprise a microprocessor 310 and a memory 320, both coupled to the system bus 370, as best viewed in FIG. 5. The microprocessor 310 can be provided by a general purpose microprocessor or by a specialized microprocessor (e.g., an ASIC). In one embodiment, the EIR terminal 100 can comprise a single microprocessor which can be referred to as a central processing unit (CPU). In another embodiment, the EIR terminal 100 can comprise two or more microprocessors, for example a CPU and a specialized microprocessor (e.g., an ASIC). In one embodiment, the memory 320 can be provided by RAM, ROM, EPROM, and/or SIM card-based memory.

The EIR terminal 100 can further comprise one or more EIR devices 315, including a bar code reading device, an RFID reading device, and a card reading device, also coupled to the system bus 370. In one embodiment, an EIR reading device can be capable of outputting decoded message data corresponding to an encoded message. In another embodiment, the EIR reading device can output raw message data comprising an encoded message, e.g., raw image data or raw RFID data.

Of course, devices that read bar codes, read RFID, or read cards bearing encoded information may read more than one of these categories while remaining within the scope of the invention. For example, a device that reads bar codes may include a card reader, and/or RFID reader; a device that reads RFID may also be able to read bar codes and/or cards; and a device that reads cards may be able to also read bar codes and/or RFID. For further clarity, it is not necessary that a device's primary function involve any of these functions in order to be considered such a device; for example, a cellular telephone, smartphone, or PDA that is capable of reading bar codes is a device that read bar codes for purposes of the present invention The EIR terminal 100 can further comprise a keyboard interface 354, a display adapter 355, both also coupled to the system bus 370. The EIR terminal 100 can further comprise a battery 356.

In one embodiment, the EIR terminal 100 can further comprise a GPS receiver 380. In one embodiment, the EIR terminal 100 can further comprise at least one connector 390 configured to receive a subscriber identity module (SIM) card.

The EIR terminal 100 can further comprise a communication interface 340 which can be provided, e.g., by a 802.11-compliant wireless communication interface, or by an Ethernet interface. A skilled artisan would appreciate the fact that other types of network interfaces are within the spirit and the scope of the invention.

In one embodiment, the EIR terminal 100 can be in communication with a computer 151 which is connected to the LAN 500 of FIG. 1. In one embodiment, the EIR terminal 100 can connect to the LAN 500 via a wireless access point 505 using a 802.11-compliant wireless interface. In another embodiment, the EIR terminal can connect to the LAN 500 via an Ethernet interface (e.g., via a docking station). A skilled artisan would appreciate the fact that other ways of connecting EIR terminal to the LAN 500 are within the spirit and the scope of the invention.

In one embodiment, the LAN 500 can be connected to WAN (e.g., the Internet) 900 via a router 600. The EIR terminal can be in communication with a remote computer 155 which can be connected to the Internet via a router 157.

While different networks are designated herein, it is recognized that a single network as seen from the network layer of the OSI model can comprise a plurality of lower layer networks, i.e., what can be regarded as a single Internet Protocol (IP) network, can include a plurality of different physical networks.

Figures 6A, 6B:
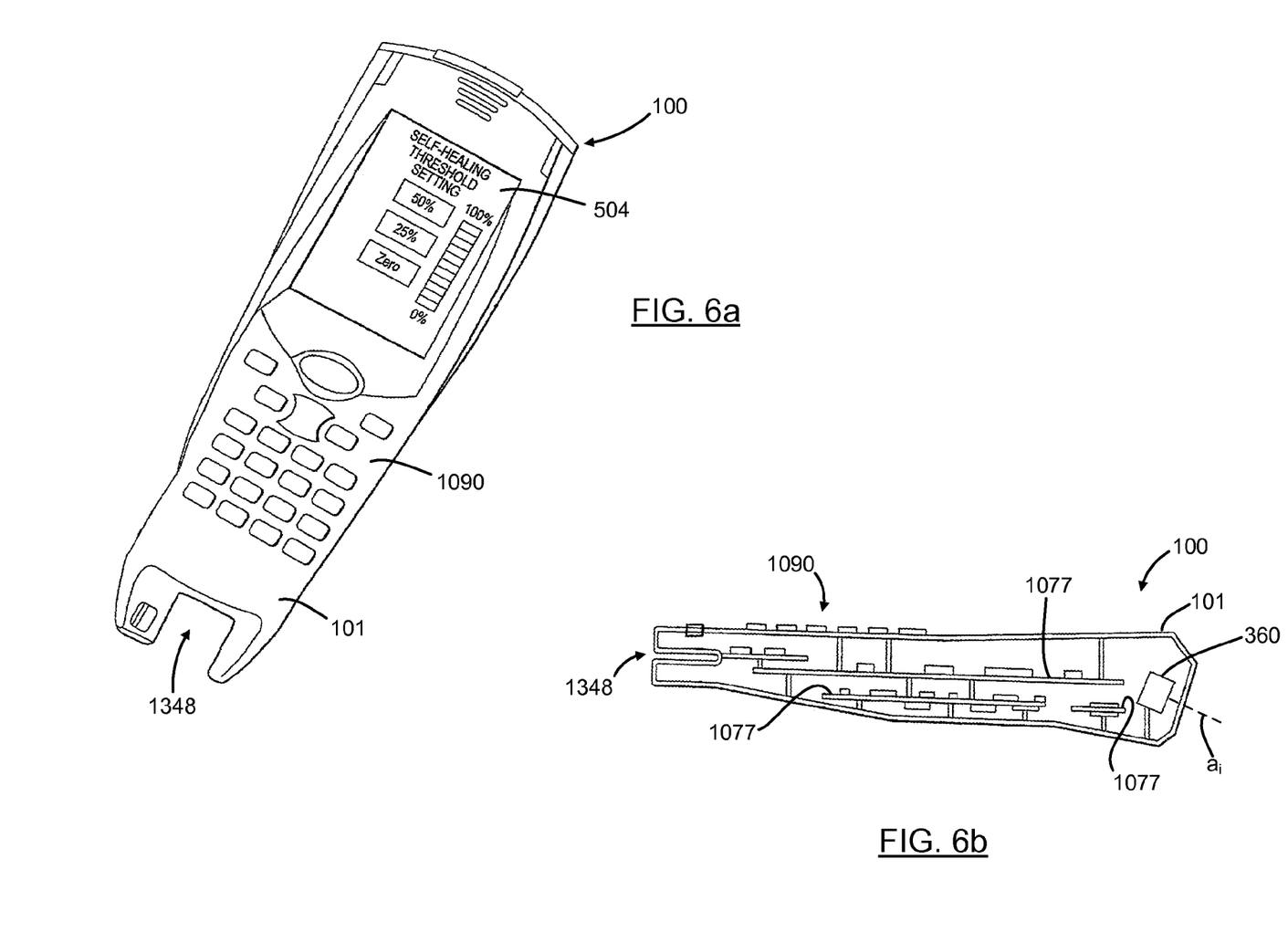
FIGS. 6a and 6b illustrate an exemplary hand held EIR terminal housing.

Form factors and housings for the EIR terminal according to the invention are now being described. The components of EIR terminal 100 can be incorporated into a variety of different housings. As indicated by the embodiment of FIGS. 6a and 6b, the components of FIG. 5 can be incorporated into a hand held housing 101. EIR terminal 100 of FIGS. 6a and 6b is in the form factor of a hand held portable data terminal. EIR terminal 100 as shown in FIGS. 6a and 6b can include a keyboard 1090, a display 504 having an associated touch screen overlay, a card reader 1348, and an imaging module 360 which can include the components of imaging assembly as described herein; namely, image sensor array incorporated on an image sensor IC chip. As indicated by the side view of FIG. 6b, the components of the block diagram of FIG. 5 may be supported within housing 101 on a plurality of circuit boards 1077. Imaging module 360 may include an image sensor array having color sensitive pixels as described in Provisional Patent Applications No. 60/687,606, filed Jun. 3, 2005, 60/690,268, filed Jun. 14, 2005, 60/692,890, filed Jun. 22, 2005, and 60/694,371, filed Jun. 27, 2005, all of which are entitled Digital Picture Taking Optical Reader Having Hybrid Monochrome And Color Image Sensor, and all of which are incorporated herein by reference.

Figure 7A:
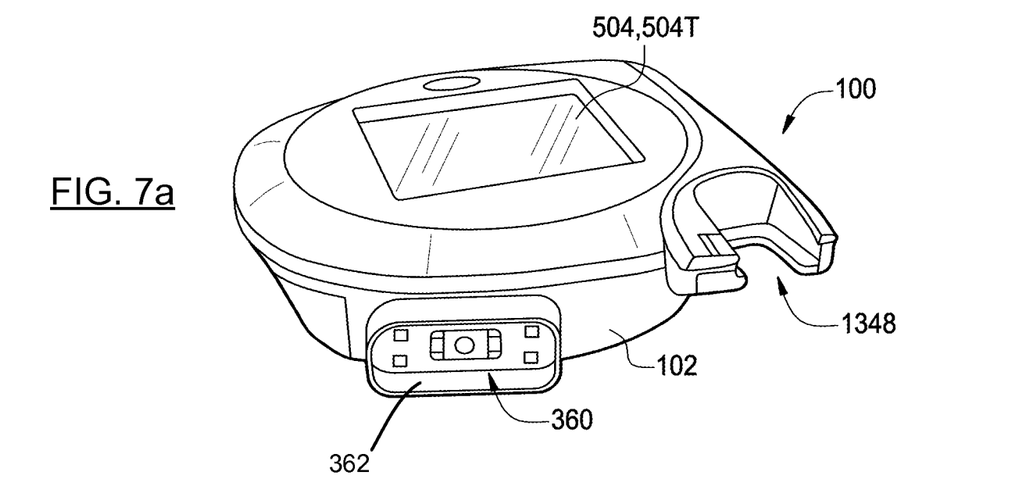
FIGS. 7a-7c illustrate an exemplary portable and remountable EIR terminal housing.
Figure 7B:
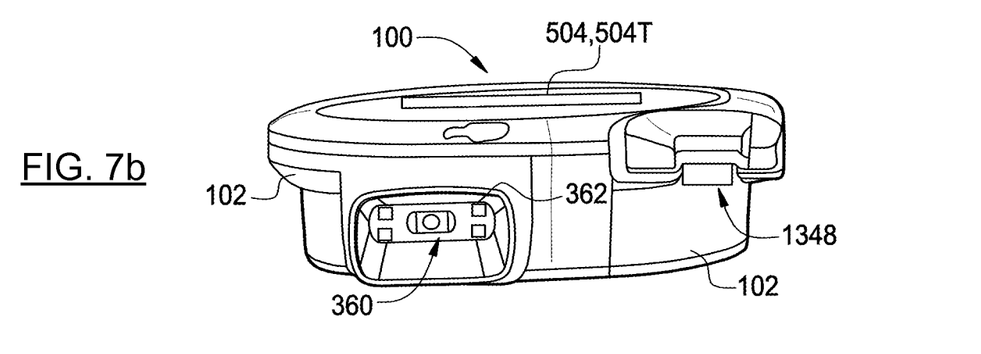
Figure 7C:
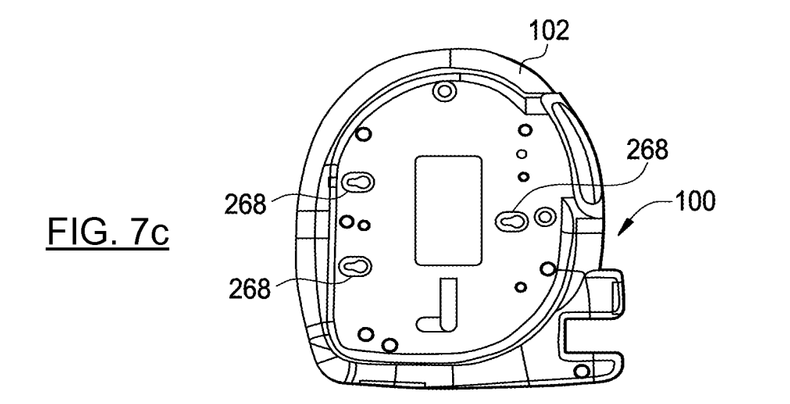

In the embodiment of FIGS. 7a-7c, the EIR terminal 100 is in the form of a transaction terminal which may be configured as a retail purchase transaction terminal or as a price verifier. Housing 102 of the transaction terminal shown in FIGS. 7a-7c is configured to be portable so that it can be moved from location to location and is further configured to be replaceably mounted on a fixed structure such as a fixed structure of a cashier station or a fixed structure of the retail store floor. Referring to bottom view of FIG. 7c, the housing 102 of the EIR terminal 100 can have formations 268 facilitating the replaceable mounting of EIR terminal 100 on a fixed structure. Referring now to FIG. 7b, EIR terminal 100 can include a display 504 having an associated touch screen 504T, a card reader 1348, an imaging module 360, and a luminous shroud 362.

Figure 8:
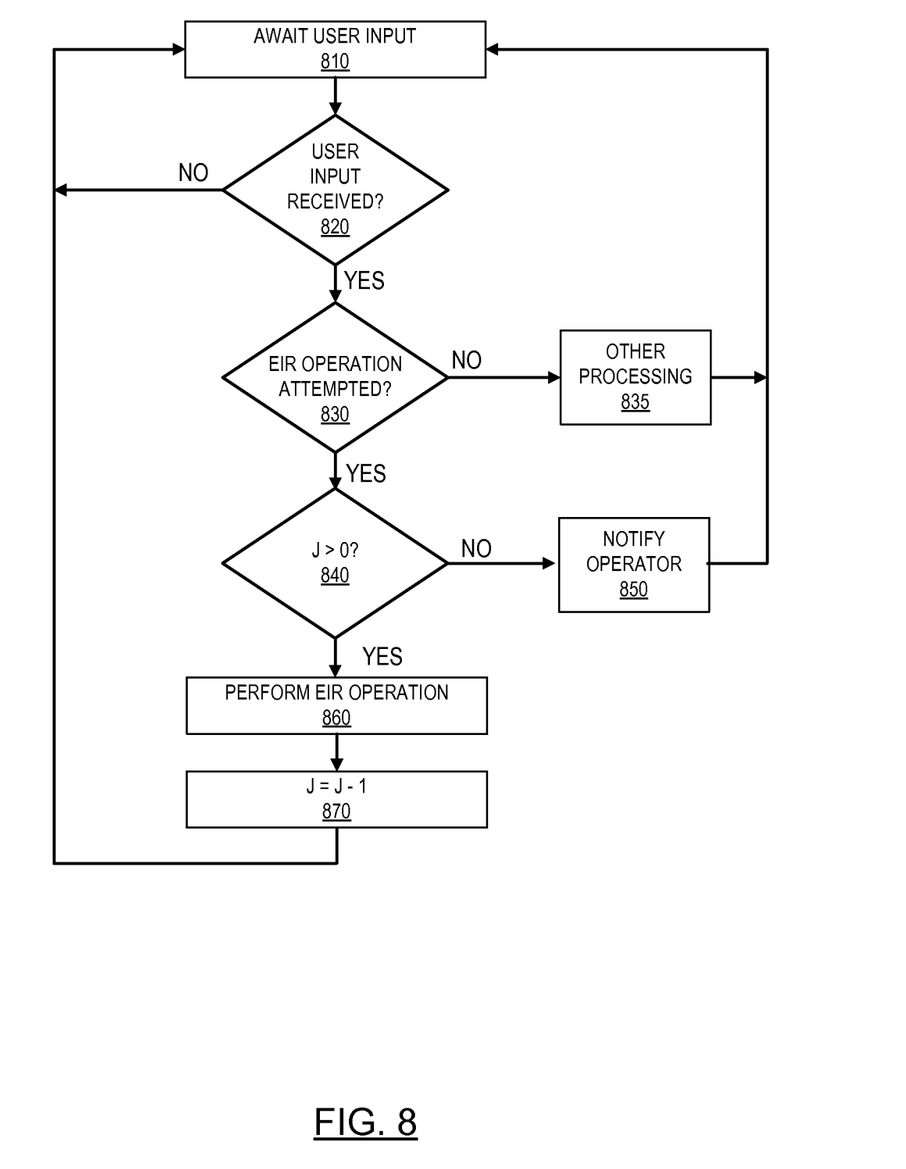
FIG. 8 illustrates a flowchart of one embodiment of the method of implementing the pre-paid usage model by an EIR terminal according to the invention.

One embodiment of the method of implementing the pre-paid usage model by an EIR terminal according to the invention is now being described with references to the flowchart depicted in FIG. 8.

At steps 810 and 820, the method can await a command input by the terminal operator.

At step 830, the method can ascertain whether an EIR operation was attempted. If so, the method can continue to step 840.

At step 840, the method can ascertain whether the value of the counter of EIR operations is more than zero. If so, the method can continue to step 860. Otherwise the method can branch to step 850 to notify the EIR terminal operator that the attempted EIR operation could not be performed unless a new batch of EIR operations would be pre-paid.

At step 860, the method can perform the EIR operation requested by the terminal operator.

At step 870, the method can decrement the value of the counter of EIR operations, which can be stored in a non-volatile memory. Upon completing step, the method can loop back to step 810.

In another embodiment of the method of implementing the pre-paid usage model by an EIR terminal, the counter of EIR operations can be initialized with zero, can be incremented before each attempted EIR operation, and can be compared with the number of pre-paid operations to ascertain whether the attempted EIR operation could be allowed.

Upon receiving the notification that an attempted EIR operation could not be allowed (or upon receiving an earlier notification, e.g., that a 90% of pre-paid operations threshold has been reached), the operator can order an unlocking message for the new batch of EIR operations. In one embodiment, the unlocking message can be delivered to the EIR terminal in a form of bar code. In one embodiment, the unlocking message can be delivered to the EIR terminal as a bit stream over a network. The EIR terminal can be configured to initialize the value of the counter of EIR operations responsive to inputting the unlocking encoded message.

A small sample of systems methods and apparatus that are described herein is as follows:

A1. An encoded information reading (EIR) terminal comprising:
a central processing unit (CPU);
a memory communicatively coupled to said CPU;
a communication interface;
an EIR device selected from the group consisting of: a bar code reading device, an RFID reading device, and a card reading device, said EIR device configured to perform one of: outputting raw message data containing an encoded message, outputting decoded message data corresponding to an encoded message;
wherein said EIR terminal is configured to initialize a counter of EIR operations responsive to inputting an unlocking encoded message via one of: said communication interface, said EIR device;
wherein said EIR terminal is further configured, before executing an EIR operation, to ascertain whether said EIR operation is permitted by comparing said counter of EIR operations to a pre-defined constant value;
wherein said EIR terminal is further configured to perform one of: incrementing said counter of EIR operations, decrementing said counter of EIR operations in course of executing each EIR operation.

A2. The EIR terminal of A1, wherein said memory comprises a volatile memory and a non-volatile memory; and wherein said counter of EIR operation is stored in said non-volatile memory.

A3. The EIR terminal of A1, wherein said counter of EIR operations reflects one of: a number of executed EIR operations, a number of remaining pre-paid EIR operations.

A4. The EIR terminal of A1, wherein said pre-defined constant value is equal to one of: zero, a number of pre-paid EIR operations.

A5. The EIR terminal of A1, wherein said unlocking message includes a number of pre-paid EIR operations.

A6. The EIR terminal of A1, wherein said unlocking message is encrypted using one of: a shared key encryption method, an asymmetric key encryption method.

A7. The EIR terminal of A1, wherein said EIR terminal is further configured to notify an operator of said EIR terminal responsive to ascertaining that an attempted EIR operation is not permitted.

A8. The EIR terminal of A1, wherein said EIR terminal is further configured to transmit a message to an external system responsive to ascertaining that an attempted EIR operation is not permitted.

B1. A fleet management system for managing a plurality of EIR terminals, each EIR terminal of said plurality of EIR terminals including an EIR device selected from the group consisting of: a barcode reading device, an RFID reading device, and a card reading device, said fleet management system comprising:

one or more computers, each computer comprising a central processing unit, a memory, and a communication interface;

a fleet management software module being executed by at least one computer of said one or more computers; and a payment processing software module in communication with said fleet management software module, said payment processing software module being executed by at least one computer of said one or more computers;

wherein said fleet management software module is configured, responsive to receiving a customer initiated request, to generate an unlocking message upon processing a payment by said payment processing software module;

wherein said unlocking message is provided by one of: a bar code to be read by an EIR terminal, a bit stream to be transferred to an EIR terminal via said communication interface; and wherein each EIR terminal of said plurality of EIR terminals is configured to perform not more than a pre-defined number of EIR operations responsive to receiving said unlocking message.

B2. The fleet management system of B1 further comprising a fleet management database in communication with said fleet management software module, said fleet management database residing on one or more computers;

wherein said fleet management software module is configured, responsive to receiving said customer initiated request, to query said fleet management database before generating said unlocking message.

B3. The fleet management system of B1, wherein said payment processing software module is configured to perform at least one of: credit card processing; bank account direct debit.

B4. The fleet management system of B1, wherein said payment processing software module is configured to query an external payment processing system.

B5. The fleet management system of B1 further comprising an HTTP server software module in communication with said fleet management software module, said HTTP server software module being executed by at least one computer of said one or more computers;

wherein said HTTP server software module is configured to input said customer initiated request.

B6. The fleet management system of B1 further comprising a fleet management database in communication with said fleet management software module, said fleet management database residing on one or more computers;

wherein said fleet management database comprises a plurality of fleet management records, each fleet management record including a terminal identifier field, a payment amount field, and a number of allowed scans field.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

I claim:

1. An encoded information reading (EIR) terminal comprising:

a central processing unit (CPU);

a memory communicatively coupled to said CPU;

a communication interface;

an EIR device selected from the group consisting of: a bar code reading device, an RFID reading device, and a card reading device, said EIR device configured to perform one of: outputting raw message data containing an encoded message, outputting decoded message data corresponding to an encoded message;

wherein said EIR terminal is configured to initialize a counter of EIR operations, stored in said memory, responsive to inputting an unlocking encoded message via one of: said communication interface, said EIR device;

wherein said EIR terminal is further configured, before executing an EIR operation, to ascertain whether said EIR operation is permitted by comparing said counter of EIR operations to a pre-defined constant value;

wherein said EIR terminal is further configured to perform one of: incrementing said counter of EIR operations, decrementing said counter of EIR operations in the course of executing each EIR operation; and wherein said counter of EIR operations reflects one of: a number of executed EIR operations, a number of remaining pre-paid EIR operations.

2. The EIR terminal of claim 1, wherein said memory comprises a volatile memory and a non-volatile memory; and wherein said counter of EIR operation is stored in said non-volatile memory.

3. The EIR terminal of claim 1, wherein said pre-defined constant value is equal to one of: zero, a number of pre-paid EIR operations.

4. The EIR terminal of claim 1, wherein said unlocking encoded message includes a number of pre-paid EIR operations.

5. The EIR terminal of claim 1, wherein said unlocking encoded message is encrypted using one of: a shared key encryption method, an asymmetric key encryption method.

6. The EIR terminal of claim 1, wherein said EIR terminal is further configured to notify an operator of said EIR terminal responsive to ascertaining that an attempted EIR operation is not permitted.

7. The EIR terminal of claim 1, wherein said EIR terminal is further configured to transmit a message to an external system responsive to ascertaining that an attempted EIR operation is not permitted.

8. A fleet management system for managing a plurality of EIR terminals, each EIR terminal of said plurality of EIR terminals including an EIR device selected from the group consisting of: a barcode reading device, an RFID reading device, and a card reading device, said fleet management system comprising:

one or more computers, each computer comprising a central processing unit, a memory, and a communication interface;

a fleet management software module being executed by at least one computer of said one or more computers; and a payment processing software module in communication with said fleet management software module, said payment processing software module being executed by at least one computer of said one or more computers;

wherein said fleet management software module is configured, responsive to receiving a customer initiated request, to generate an unlocking message upon processing a payment by said payment processing software module;

wherein said unlocking message is provided by one of: a bar code to be read by an EIR terminal, a bit stream to be transferred to an EIR terminal via said communication interface;

wherein each EIR terminal of said plurality of EIR terminals comprises a memory and is configured to initialize a counter of EIR operations, stored in said memory, responsive to receiving said unlocking message;

wherein each EIR terminal of said plurality of EIR terminals is configured, before executing an EIR operation, to ascertain whether said EIR operation is permitted by comparing said counter of EIR operations to a pre-defined constant value;

wherein each EIR terminal of said plurality of EIR terminals is further configured to perform one of: incrementing said counter of EIR operations, decrementing said counter of EIR operations in the course of executing each EIR operation; and wherein said counter of EIR operations reflects one of: a number of executed EIR operations, a number of remaining pre-paid EIR operations.

9. The fleet management system of claim 8 further comprising a fleet management database in communication with said fleet management software module, said fleet management database residing on one or more computers;

wherein said fleet management software module is configured, responsive to receiving said customer initiated request, to query said fleet management database before generating said unlocking message.

10. The fleet management system of claim 8, wherein said payment processing software module is configured to perform at least one of: credit card processing; bank account direct debit.

11. The fleet management system of claim 8, wherein said payment processing software module is configured to query an external payment processing system.

12. The fleet management system of claim 8 further comprising an HTTP server software module in communication with said fleet management software module, said HTTP server software module being executed by at least one computer of said one or more computers;

wherein said HTTP server software module is configured to input said customer initiated request.

13. The fleet management system of claim 8 further comprising a fleet management database in communication with said fleet management software module, said fleet management database residing on one or more computers;

wherein said fleet management database comprises a plurality of fleet management records, each fleet management record including a terminal identifier field, a payment amount field, and a number of allowed scans field.

14. An encoded information reading (EIR) terminal comprising:

a memory storing a counter of EIR operations, the counter of EIR operations reflecting either a number of executed EIR operations or a number of remaining pre-paid EIR operations;

a communication interface;

an EIR device comprising a bar code reading device, an RFID reading device, and/or a card reading device;

wherein the EIR terminal is configured to:

initialize the counter of EIR operations, stored in the memory, responsive to inputting an unlocking encoded message via the communication interface and/or the EIR device;

before executing an EIR operation, ascertain whether the EIR operation is permitted by comparing the counter of EIR operations to a pre-defined constant value; and in the course of executing each EIR operation, either increment the counter of EIR operations or decrement the counter of EIR operations.

15. The EIR terminal of claim 14, wherein the memory comprises a volatile memory and a non-volatile memory; and wherein the counter of EIR operation is stored in the non-volatile memory.

16. The EIR terminal of claim 14, wherein the pre-defined constant value is equal to one of: zero, a number of pre-paid EIR operations.

17. The EIR terminal of claim 14, wherein the unlocking encoded message comprises a number of pre-paid EIR operations.

18. The EIR terminal of claim 14, wherein the unlocking encoded message is encrypted using a shared key encryption method or an asymmetric key encryption method.

19. The EIR terminal of claim 14, wherein the EIR terminal is configured to notify an operator of the EIR terminal responsive to ascertaining that an attempted EIR operation is not permitted.

20. The EIR terminal of claim 14, wherein the EIR terminal is configured to transmit a message to an external system responsive to ascertaining that an attempted EIR operation is not permitted.

\* \* \* \* \*